United States Patent [19]

Babayan et al.

[11] 4,045,527
[45] Aug. 30, 1977

[54] POLYURETHANE AND COMPOSITE THEREOF

[75] Inventors: Eduard P. Babayan, Huntington Beach; Michael H. Rourke, Santa Ana, both of Calif.

[73] Assignee: Hitco, Irvine, Calif.

[21] Appl. No.: 654,956

[22] Filed: Feb. 3, 1976

Related U.S. Application Data

[63] Continuation-in-part of Ser. No. 508,507, Sept. 23, 1974, abandoned.

[51] Int. Cl.$^2$ .................... B29D 3/02; C08G 18/48; C08G 18/26; B32B 27/40
[52] U.S. Cl. .................... 264/46.7; 260/77.5 AQ; 260/77.5 AT; 260/77.5 AB; 264/101; 264/102; 264/74; 264/309; 264/340; 428/425
[58] Field of Search .............. 260/77.5 AQ, 77.5 AT, 260/77.5 AB; 264/101, 102, 74, 309, 340, 46.7; 428/425

[56] References Cited

U.S. PATENT DOCUMENTS

| 3,042,631 | 7/1962 | Strandskov | 260/77.5 AQ |
|---|---|---|---|
| 3,112,281 | 11/1963 | Gromacki et al. | 260/77.5 AQ |
| 3,165,567 | 1/1965 | Olson | 264/309 |
| 3,201,136 | 8/1965 | Harrison et al. | 260/77.5 AB |
| 3,352,830 | 11/1967 | Schmitt et al. | 260/77.5 AT |
| 3,705,228 | 12/1972 | Mattingly | 264/309 |

OTHER PUBLICATIONS

DAS 1,224,027, Volkswagenwerk A/G, Sept. 1966.

*Primary Examiner*—H.S. Cockeram
*Attorney, Agent, or Firm*—Marvin E. Jacobs

[57] ABSTRACT

A low toxicity, castable, fast curing, polyurethane high strength elastomer is prepared from a liquid prepolymer diol, a cycloaliphatic diisocyanate, a polyalkanol amine and a small amount of soluble metal salt catalyst. The composition can be formulated by either a prepolymer or "one-shot" technique and cures at ambient temperature.

18 Claims, No Drawings

POLYURETHANE AND COMPOSITE THEREOF

CROSS-REFERENCE TO RELATED APPLICATIONS

This application is a continuation-in-part of Ser. No. 508,507, filed Sept. 23, 1974, now abandoned.

BACKGROUND OF THE INVENTION

1. Field of the Invention

The present invention relates to a castable polyurethane and, more particularly, to a polyurethane absent toxic and carcinogenic compounds.

2. Description of the Prior Art

One of the most widely used castable polyurethanes has been based on a prepolymer system including toluene diisocyanate (TDI), a polyalkylene glycol and MOCA which is 4,4-methylene-bis-(2-chloroaniline). This system gained much popularity in the past as a potting or casting material due to its ability to consistently cure to materials having exceptionally high physical properties. However, MOCA is now a proven carcinogenic substance and the high level of toxicity of the low boiling TDI requires that other castable urethane compositions be developed that are free of these obnoxious materials.

SUMMARY OF THE INVENTION

A novel and improved castable polyurethane composition is provided in accordance with the invention comprising a liquid prepolymeric diol, a diisocyanate, at least 50% by weight of which is a cycloaliphatic diisocyanate, a minor amount of a polyalkanol amine, preferably a tetrahydroxyalkyl alkylene diamine curing agent and a very low controlled amount of soluble metal salt catalyst. The composition has low toxicity, is absent the dangerous MOCA compound and cures under ambient conditions at an acceptable rate to a material having good stability and excellent physical properties.

It is surprising that compared to the fast reacting MOCA, a slow reacting cycloaliphatic isocyanate such as isophorone diisocyanate (IPDI) is cured with a slow reacting polyol chain extender to yield the same consistent high physical properties as MOCA cured formulations. Furthermore, the use of polyfunctional materials in major amounts in urethane elastomers generally results in drastic reduction in the elongation of the material and overall reduced strength. Also, systems that use only diols are not acceptable since they cure too slowly and exhibit poor hydrolytic stability. However, the use of Quadrol in small amounts in the formulation of the invention does not drastically affect the elongation and high strength is achieved. Moreover, when using a slow reacting cycloaliphatic isocyanate, such as IPDI, in sealant applications where room temperature cure is also needed, large amounts of catalyst would usually be needed. However, large amounts of metal catalysts adversely affect the hydrolytic stability of the sealant rendering it unsuitable for such applications. However, in the present invention by the combination of small amounts of metal catalyst with Quadrol, a reactive and nonmigratory tertiary amine, a synergistic curing activity is achieved which does not adversely affect hydrolytic stability and yet surprisingly gives excellent physical properties; Furthermore, the IPDI based casting materials because of the great difference in the reactivity of the aliphatic and cycloaliphatic isocyanate groups yield prepolymers with a much lower viscosity and more uniform chain distribution. Also, prepolymers with lower free isocyanate can be manufactured with IPDI compared to the same prepolymer based on TDI. Because of the lower free isocyanate content of these prepolymers and because of the lower vapor pressure of IPDI, prepolymers based on IPDI have considerably lower working toxicity.

Another surprising phenomenon attendant the use of these IPDI-polyol based casting materials is their versatility in that they yield the same properties by both the one-shot method and by the prepolymer method. In the one-shot method, the polyols and non-isocyanate ingredients are blended together into a first part and prior to use are mixed with the diisocyanate as a second part. In the prepolymer method, the diol is usually pre-reacted with the diisocyanate to yield an isocyanate terminated prepolymer which prior to use is mixed with the chain extender and curative.

The one-shot technique has many economical advantages and eliminates the prepolymer reaction. Further, because of the difference in the reactivity of the aliphatic and cycloaliphatic isocyanate groups and the slower overall reaction rate of IPDI, a quasi-prepolymer can easily be prepared. This quasi-prepolymer basically is a prepolymer that contains large amounts of IPDI as diluent.

The composition will find use as a casting resin, potting compound or general sealant. The absence of TDI renders the composition less moisture sensitive and the composition cures to a material having longer pot life, higher hydrolytic stability and improved strength at higher temperature. Compositions utilizing polytetramethylene glycol are found to have excellent hydrolytic stability and will find use as a potting compound for helicopter blades and electrical encapsulants.

The composition of the invention readily lends itself to one-shot formulation. Packaging and shipping are facilitated as are automatic dispensing. Furthermore, since application and use are less complicated and since the composition is not as sensitive to formulation, dispensing or cure, the composition can be utilized by less skilled personnel with less danger of errors and/or rejects.

The composition of the invention can be readily incorporated into products, the surface of which is in contact with animal or human feeds such as conveyor belts or grain or feed chutes. The composition is cast onto a substrate such as canvas or expanded metal and impregnates the substrate and cures to a smooth flexible sheet. A further aspect of the invention relates to elimination of flame treatment of the surface of the precured casting to remove entrapped gases. In accordance with the invention, a dilute spray of a defoaming agent such as 2 to 10% by weight of a methyl silicone oil is effective in elimination of bubbles.

These and many other attendant advantages of the invention will become apparent as the invention becomes better understood by reference to the following detailed description.

DESCRIPTION OF THE PREFERRED EMBODIMENTS

The liquid polyalkylene prepolymer glycol may have a molecular weight from 500 to 5,000 and a functionality from 1.5 to 5. Polytetramethylene glycols are preferred for purposes of forming products having excellent hydrolytic stability. Preferred polytetramethylene ether glycols generally have a molecular weight from 500 to 3,000 and a functionality from 1.7 to 3.5 and are suitably Polymeg 650, 1,000 or 2,000. In the case of the higher molecular weight polyol, it may be necessary to utilize 3–20 parts per 100 parts of the glycol prepolymer resin (phr) of a diol containing 3–20 carbon atoms, preferably an alkylene diol, such as butane diol as a hardener.

The cycloaliphatic diisocyanate can be a material such as $H_{12}$ which is 4,4'-methylene-bis-(cyclohexyl isocyanate) but is preferably a mixed aliphatic-cycloaliphatic diisocyanate such as compounds of the formula:

$$O=C=N-R^1-Z-N=C=O$$

where $R^1$ is alkylene of 1–10 carbon atoms and Z is a saturated cycloaliphatic ring containing 4–12 carbon atoms.

The preferred diisocyanate is an alkylated, isocyantoalkyl cyclohexyl isocyanate of the formula:

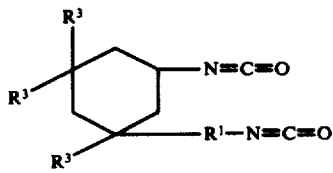

where $R^3$ is lower alkyl. When all the $R^3$ are methyl and $R^1$ is methylene, the compound is isophorone diisocyanate (IPDI). The synergistic curing agent is a tetraalkanol amine of the formula:

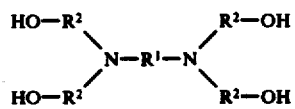

where $R^1$ is alkylene of 2–6 carbon atoms and $R^2$ is selected from straight or branch chain alkylene or polyether containing 1–8 carbon atoms. A representative compound is Quadrol which is N,N,N',N'-tetra-kis-(2-hydroxypropyl) ethylenediamine.

The composition also contains 0.01 to 5 phr, preferably 0.05 to 0.2 phr, of an organometallic curing catalyst such as dibutyl tin dilaurate, lead octoate, zinc octoate or zirconium acetylacetonate and 1–5 phr of a drying agent such as a molecular sieve. Colloidal or amphoteric silicate fillers can be added in an amount from 1–10 phr to improve the handling of the casting material. Minor amounts of other additives such as ultraviolet absorber, antioxidants or dyes and pigment can be added if desired.

Preferred and general part A and B formulations are provided in the following table:

Table 1

| Ingredient | Range | Preferred |
|---|---|---|
| PART A | | |
| Polymeg 650 (MW-650) | 100 pbw** | |
| Quadrol | 4–20 phr* | 12 |
| Antioxidant | 0.1–1 phr | 0.5 |
| U.V. Stabilizer | 0.1–1 phr | 0.5 |
| Molecular Sieve | 1–5 phr | 2 |
| Fillers | | |
| Aerosil R-972 | 0.25–2 phr | 1 |
| Carbon Black R-660 | 0.25–2 phr | 1 |
| Defoamer(Silicone) | 0.01–1 phr | 0.5 |
| PART B | | |

Table 1-continued

| Ingredient | Range | Preferred |
|---|---|---|
| IPDI | 50–70 pbw | 60 |

*phr — per 100 parts by weight of glycol prepolymer resin
**pbw — parts by weight

| PART A | Ex. 1 pbw | Ex. 2* pbw |
|---|---|---|
| Polytetramethylene glycol (2,000) | 100 | 100 |
| Dibutylditindilaurate | 0.2 | 0.2 |
| Lead Octoate | 0.06 | 0.06 |
| 1,4-Butanediol | 15.5 | 18.0 |
| Quadrol | 4 | — |

Part A was blended and mixed with 49.5 parts of IPDI, vacuumed and then cured at 180° F for 18 hours.

The cast material of Example 1 has a tensile strength of 3800 psi, an elongation of 555%, a tear strength of 270 pli, a Shore A hardness of 82 and excellent hydrolytic stability. The cast material of Example 2 has a tensile strength of 6200 psi, an elongation of 550% and a Shore A hardness of 77. The cast and cured specimen were subjected to hydrolytic stability testing at 212° F and in a pressure bomb at 270° F. The Example 2 specimen fused at 212° F and in the 270° F test, the material melted and reverted completely. The Example 1 material remained solid and elastomeric and suffered little degradation in properties. These experiments demonstrate that in absence of a small amount of Quadrol, the cured material is thermoplastic and has poor hydrolytic stability making the material unsuitable for use as a sealant.

| PART A | Ex. 3 pbw | Ex. 4 pbw | Ex. 5 pbw |
|---|---|---|---|
| Polymeg 650 | 62.5 | 70 | 80 |
| Quadrol | 37.5 | 19 | 11 |
| Dibutyltindilaurate | 0.015 | 0.015 | 0.015 |
| Lead Octoate | 0.03 | 0.03 | 0.03 |

*Formulation of Example 1 and 2 have exactly the same hydroxy number.

| PART B | Ex. 3 | Ex. 4 | Ex. 5 |
|---|---|---|---|
| IPDI | 78 | 41.5 | 60.0 |

100 parts of Part A were mixed, vacuumed and then mixed with the indicated amount of Part B and cured at 180° F for 18 hours.

The cured specimen of Example 3 had a Shore D hardness of 75, a tensile strength of 4400 psi and an elongation of 6–7% and is unsuitable as a sealant due to its low elongation and absence of elastomeric properties. The peel and adhesive strengths were also extremely poor.

The cast material of Example 4 had a tensile strength of 3500, a Shore A hardness of 94, elongation of 200%, and a tear strength of 330 pli. The cast material of Example 5 had a tensile strength of 2200 psi, a Shore A hardness of 64, an elongation of 350% and a tear strength of 200 pli. Both materials are suitable sealants.

Other examples of practice follow.

Example 6

| ONE-SHOT METHOD | |
|---|---|
| PART A | Parts |
| Polytetramethylene glycol MW-650 | 89.3 |

Example 6-continued

| ONE-SHOT METHOD | |
|---|---|
| PART A | Parts |
| N,N,N',N'-tetra-kis-(2-hydroxypropyl) ethylenediamine | 11.15 |
| Dibutyl ditinlaurate | 0.015 |
| Lead Octoate | 0.03 |

To 110 parts of the above mixture, 50 parts of IPDI is added, mixed and vacuumed. The working pot life of this mixture at 77° F is over one and one-half hour in masses of 250 grams.

This material is then cast in a thin sheet and cured for six to 18 hours at 180° F. The cast material has a Shore A hardness of 64, tensile is 2200 psi, an elongation of 350% and a tear strength of 200 pli. These physical properties are obtainable either after a six hour cure at 180° F or two hours at 180° F plus two hours at 230° F.

Example 7

| PREPOLYMER TYPE | |
|---|---|
| PART A | parts |
| Polytetramethylene glycol MW-650 | 62.2 |
| IPDI | 46.8 |
| Dibutyl ditinlaurate | 0.053 |

The polytetramethylene glycol is reacted completely with the IPDI to form an isocyanate terminated prepolymer.

| PART B | Parts |
|---|---|
| Polytetramethylene glycol MW-650 | 22.0 |
| N,N,N',N'-tetra-kis-(2-hydroxypropyl) ethylenediamine | 11.15 |

To 114.2 parts of Part A, 35.8 parts of Part B is added and cured under the same conditions as in Example 4. The cast material has a Shore A hardness of 64, a tensile of 2000 psi, an elongation of 340% and a tear strength of 190 pli.

EXAMPLE 8

SEMI-PREPOLYMER

To 30 parts of the Part A blend from Example 6, 50 parts of IPDI is added, mixed and kept at 180° F for two hours.

80 parts of this semi-prepolymer is mixed with 80 parts of the Part A blend of Example 6. This mixture is then vacuumed and cast, cured under the same conditions as in Example 6. The Shore A hardness of this cured blend is 64, tensile is 2250 psi, elongation is 350% and tear strength is 195 pli.

The advantage of such a semi-prepolymer is that both parts can have the same volume and can be mixed and dispensed through simple available dispensing equipment that have a 1:1 ratio.

Example 9

| | Parts |
|---|---|
| Polytetramethylene glycol MW-650 | 70.0 |
| N,N,N',N'-tetra-kis-(2-hydroxypropyl) ethylenediamine | 19.0 |
| Dibutyl ditinlaurate | 0.012 |

Example 9-continued

| | Parts |
|---|---|
| Lead Octoate | 0.024 |

100 parts of the above blend is mixed with 41.5 parts of IPDI, vacuumed, cast and cured under the same conditions as in Example 2. The cured material has a Shore A hardness of 94, a tensile strength of 3500 psi, an elongation of 200% and a tear strength of 330 pli.

As can be seen from this example and Example 6, by changing the amount of N,N,N',N'-tetra-kis-(2-hydroxypropyl) ethylenediamine the hardness of the cast material can be varied. By utilizing an intermediate amount of N,N,N',N'-tetra-kis-(2-hydroxypropyl) ethylenediamine, a hardness in the range of 60–90 Shore A can be obtained. The same physical properties of Example 5 are obtained by either prepolymer or semi-prepolymer approach.

By increasing the molecular weight of the polytetramethylene glycol and addition of a chain extender such as Butanediol, the cross-linking density is reduced and materials with higher elongation can be derived.

The use of a ditertiary polyalkanol amine such as N,N,N',N'-tetra-kis-(2-hydroxypropyl) ethylenediamine in these formulations permits cure rates that are practical for sealant application purposes.

Example 10

| SEMI-PREPOLYMER | |
|---|---|
| PART A | Parts |
| Polytetramethylene glycol MW-2000 | 100.0 |
| N,N,N',N'-tetra-kis-(2-hydroxypropyl) ethylenediamine | 4.0 |
| -1,4-Butanediol | 7.8 |
| Dibutyl ditinlaurate | 0.04 |
| Lead Octoate | 0.01 |

PART B 39.7 parts of the Part A blend are mixed with 29.2 parts of IPDI and kept at 180° F for two hours.

Equal parts by volume of this semi-prepolymer is mixed with the Part A polyol blend, cast and cured under the same conditions as described in Example 6. The cast material has a Shore A hardness of 62, a tensile strength of 2700 psi with a 580% elongation. The one-shot and prepolymer type materials based on the same formulation of Example 6 yields the same physical and electrical properties.

Example 11

| PART A | Parts |
|---|---|
| Polytetramethylene glycol MW-2000 | 100.0 |
| N,N,N',N'-tetra-kis-(2-hydroxypropyl) ethylenediamine | 4.0 |
| 1,4-Butanediol | 13.0 |
| Dibutyl ditinlaurate | 0.04 |
| Lead Octoate | 0.01 |

116 parts of the Part A polyol blend are mixed with 48.5 parts of IPDI, vacuumed, cast and cured under the same conditions as in Example 6. The cast material has a tensile strength of 3800 psi, an elongation of 550%, a tear strength of 270 pli and a Shore A hardness of 82.

Example 12

| PART A | Parts |
|---|---|
| Polytetramethylene glycol | |

Example 12-continued

| | |
|---|---|
| MW-2000 | 164.0 |
| 1,4-Butanediol | 36.0 |
| N,N,N',N'-tetra-kis-(2-hydroxypropyl) ethylenediamine | 1.2 |
| IPDI | 213.6 |
| Dibutyl ditinlaurate | 0.2 |
| PART B | |
| Polytetramethylene glycol MW-2000 | 346.0 |
| 1,4-Butanediol | 10.0 |
| N,N,N',N'-tetra-kis-(2-hydroxypropyl) ethylenediamine | 29.2 |

Part A utilizes a stoichiometrical amount of IPDI reacted in a suitable container. Then equal parts of Part A and Part B are mixed and cast. The Shore A hardness of the cast material is 80 and the physical properties of the cured material are similar to those of Example 11. This is an example of a prepolymer type material and although the reactivity of the different diols present in the prepolymer and the curative portion differ, the material gives excellent properties.

By increasing the amount of chain extender in Example 11, material with high Shore A hardness and tensile strengths can be formulated. By reducing the amount of chain extender, material with lower hardness can also be formulated.

The physical properties given in all these examples are based on a standard cure of 6 to 18 hours at 180° F. Should the material be cured at higher temperatures for extended periods, the physical properties of these materials improve further. Table 2 shows the change in physical properties after additional cure at 250° F.

Table 2

| | Original | | After Postcure | |
|---|---|---|---|---|
| Shore A Hardness | 62 | 82 | 64 | 84 |
| Tensile Strength, psi | 2700 | 3800 | 3500 | 5200 |
| % Elongation | 580 | 550 | 620 | 600 |

All examples given are for illustrative purposes. Other chain extenders than Butanediol can be utilized in the above formulation which may include neopentyl glycol, hexylene glycol, Bis-(2-hydroxypropyl) isophthalate, tetrabromo-Bis (hydroxypropyl) isophthalate or tetrabromo-Bis-(hydroxyethyl) isophthalate, N,N-hydroxy-propyl or -ethyl aniline, Bis-(2-hydroxyethyl ether) of Bisphenol A, Bis-(2-hydroxyethyl or propyl ether) of tetrabromo Bisphenol A or hydroquinonone diethylol ether.

Further, additional materials such as moisture scavengers antioxidant, antiozonates, high temperature stabilizers, pigments, defoamers and other auxiliary additives may be used with the urethane casting materials of this invention.

The outstanding abrasion resistance of polyurethanes has led to many important applications where severe wear is a problem. Polyurethanes have a low unlubricated coefficient of friction which decreases sharply as hardness increases. Polyurethanes also have superior load-carrying capability and significantly better impact resistance than structural plastics. All standard polyurethane compounds, including the hardest types, exhibit good, low-temperature, impact-resistance and low brittle points.

The composition of the invention has been found to be well-suited for the manufacture of non-MOCA, non-TDI, regular or reinforced cast sheets suitable for use as impact pads or chute liners. Chute liners are usually 16-gauge steel, expanded metal encapsulated sheets. The flexible, reinforced sheet can readily be bent to an accurate shape and attached by fasteners such as bolts. Chute liners are used primarily in applications where there is severe abrasion and/or impact problems such as grain elevators, stamping plants, sand blasting, manufacture of cement, etc. The liners are generally fabricated in sheet sizes of 4 feet by 4, 8, 10 or 12 feet and in thicknesses of ¼ inch to 4 inches. The hardness can be varied at will.

Impact pads can be fabricated with or without metal reinforcement and are ideal for use as fork-back pads and to protect materials such as tin plate, coil steel, plasterboard, plywood and many others. The pads provide very effective protection when used as clamp pads or as guides or stops in production operations.

The cast sheet materials are prepared by dispensing the fomulation of the invention into a heated rectangular form, leveling, eliminating entrapped bubbles and then curing. Preferred formulations are the prepolymer two-part formulations capable of equivolume dispensing. In the case of metal reinforcement, the reinforcement, typically expanded, perforated metal sheet, is laid on the surface of the form before dispensing. The novel and preferred technique for elimination of bubbles includes the step of spraying a dilute solution of a liquid polydimethyl siloxane in a concentration of from 2 to 10% by weight onto the surface of the cast material while still in the liquid stage. The reduced surface tension allows the bubbles to break and level the surface. An example of practice follows.

EXAMPLE 13

A 4' × 10' grain chute was prepared with 80 Shore A hardness material of Example 12. A casting form was prepared from a heated metal table containing ¼ inch edge forms. A sheet of perforated steel reinforcement was placed on the surface of the table. Part A and Part B were dispensed at equal rate by a 1:1 Graco through a Kinex mixing tube onto the hot metal table heated at 240° F. After leveling, a dilute solution of 4% by weight methyl silicone defoamer was sprayed onto the surface to break, bubbles. After cure for 20 minutes, the reinforced sheet was removed from the form.

It is to be realized that only preferred embodiments of the invention have been described and that numerous substitutions, modifications and alterations are all permissible without departing from the spirit and scope of the invention as defined in the following claims.

What is claimed is:

1. A mobile, curable, reactive sealant, casting or potting composition consisting essentially of;
    100 parts of a liquid prepolymeric polytetramethylene glycol polyol resin having a functionality from 1.7 to 3.5 and a molecular weight from 500 to 5,000;
    0.05 to 0.2 parts per 100 parts of glycol prepolymer resin (phr) of a metal salt curing catalyst selected from the group consisting of dibutyltindilaurate, zinc octoate, lead octoate and zirconium acetylacetonate; and
    4–20 phr of a tetraalkanol amine curing agent of the formula:

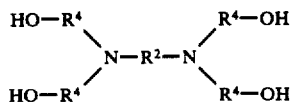

where $R^2$ is alkylene of 2-6 carbon atoms and $R^4$ is selected from straight or branch chain alkylene or polyether containing 1-8 carbon atoms; and 50-70 parts by weight of a diisocyanate, at least 50% by weight of which is a cycloaliphatic isocyanate selected from compounds of the formula:

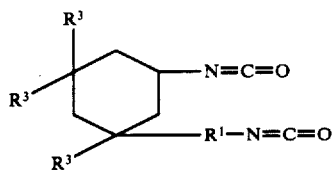

where $R^1$ is alkylene of 1-10 carbon atoms and $R^3$ is a lower alkyl of 1-8 carbon atoms.

2. A method of forming a cured, elastomeric, hydrolytically stable resin comprising the steps of:

mixing a first part consisting essentially of in relative parts by weight;

100 parts of a liquid prepolymeric polytetramethylene glycol polyol resin having a functionality from 1.7 to 3.5 and a molecular weight from 500 to 5,000;

0.05 to 0.2 parts per 100 parts of glycol prepolymer resin (phr) of a metal salt curing catalyst selected from the group consisting of dibutyltindilaurate, zinc octoate, lead octoate and zirconium acetylacetonate; and 4-20 phr of a tetraalkanol amine curing agent of the formula:

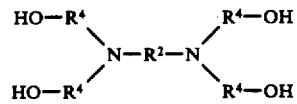

where $R^2$ is alkylene of 2-6 carbon atoms and $R^4$ is selected from straight or branch chain alkylene or polyether containing 1-8 carbon atoms; with a second part consisting essentially of 50-70 parts by weight of a diisocyanate, at least 50% by weight of which is a cycloaliphatic isocyanate selected from compounds of the formula:

where $R^1$ is alkylene of 1-10 carbon atoms and $R^3$ is a lower alkyl of 1-8 carbon atoms to form a mobile composition; and curing the mobile composition to a fully cured, rigid state.

3. A method according to claim 2 in which $R^1$ is methylene, $R^3$ is methyl and the curing agent is N,N,N',N'-tetra-kis-(2-hydroxypropyl)ethylene diamine.

4. A composition according to claim 1 in which the prepolymeric polyol is a polyalkylene glycol having a functionality from about 2 to 3 and a molecular weight from 500 to 3,000.

5. A composition according to claim 1 further including 3-20 parts by weight of a diol containing 3-20 carbon atoms.

6. A composition according to claim 1 in which $R^1$ is methylene and $R^3$ is methyl.

7. A composition according to claim 1 in which the curing agent is N,N,N',N'-tetrakis-(2-hydroxypropyl) ethylene diamine.

8. A composition according to claim 7 further including 1-10 phr of mineral fillers.

9. A composition according to claim 1 further including 0.01 to 1 weight percent of a deforming agent.

10. A composition according to claim 1 in which the metal catalyst is dibutyltindilaurate.

11. A method according to claim 2 further comprising the step of pouring the mobile mixture into a cavity before cure.

12. A method according to claim 11 in which the cavity is a sheet casting form.

13. A method according to claim 12 further including the step of leveling the mobile mixture in the form and then spraying a dilute solution of a deforming agent onto the surface of the mobile mixture.

14. A method according to claim 2 wherein the diisocyanate is prereacted with a portion of the polyol resin to form an isocyanate capped prepolymer and then reacted with the remainder of the polyol resin, and curing catalyst and the curing agent.

15. A method according to claim 2 in which the mixture is heated to a curing temperature above 150° F.

16. A method according to claim 12 further including the step of laying a sheet of perforated metal reinforcement on the base of the casting form before pouring the mobile mixture into the form.

17. A cured composition prepared according to the method of claim 2.

18. A sheet of cast material prepared according to the method of claim 16.

* * * * *